United States Patent
Zhai

(10) Patent No.: US 9,781,109 B2
(45) Date of Patent: Oct. 3, 2017

(54) METHOD, TERMINAL DEVICE, AND NETWORK DEVICE FOR IMPROVING INFORMATION SECURITY

(71) Applicant: Huawei Technologies Co., Ltd., Shenzhen (CN)

(72) Inventor: Zhengde Zhai, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 169 days.

(21) Appl. No.: 14/869,102

(22) Filed: Sep. 29, 2015

(65) Prior Publication Data

US 2016/0021111 A1 Jan. 21, 2016

Related U.S. Application Data

(63) Continuation of application No. PCT/CN2014/072755, filed on Feb. 28, 2014.

(30) Foreign Application Priority Data

Jul. 8, 2013 (CN) .......................... 2013 1 0283912

(51) Int. Cl.
*H04L 9/32* (2006.01)
*H04L 29/06* (2006.01)
(Continued)

(52) U.S. Cl.
CPC .......... *H04L 63/0876* (2013.01); *G06F 21/44* (2013.01); *H04L 63/0407* (2013.01);
(Continued)

(58) Field of Classification Search
CPC ..... H04L 63/0876; H04L 63/04; H04L 63/06; H04L 63/08; H04L 9/3236; H04L 9/3242; G06F 21/44
See application file for complete search history.

(56) References Cited

U.S. PATENT DOCUMENTS

2006/0149967 A1* 7/2006 Lee ..................... H04L 63/0492
713/168
2009/0305667 A1* 12/2009 Schultz .................. H04L 63/08
455/410
(Continued)

FOREIGN PATENT DOCUMENTS

CN 101516090 A 8/2009
CN 101959183 A 1/2011
(Continued)

OTHER PUBLICATIONS

Foreign Communication From a Counterpart Application, European Application No. 14823804.1, Extended European Search Report dated May 9, 2016, 8 pages.
(Continued)

*Primary Examiner* — Jayesh Jhaveri
(74) *Attorney, Agent, or Firm* — Conley Rose, P.C.

(57) ABSTRACT

A method, a terminal device, and a network device are provided. The method of the present invention includes acquiring, by a terminal device, a key, an identity of the terminal device, and identification information of one or more applications on the terminal device, where identification information of different applications on the terminal device is different from each other, and the identity of the terminal device includes International Mobile Equipment Identity (IMEI) and/or International Mobile Subscriber Identity (IMSI); generating, for identification information of one application by using a preset encryption algorithm according to the identity of the terminal device and the key, an encryption result corresponding to the application; and when the application runs on the terminal device, accessing a network by using the encryption result corresponding to the application. The present invention is applicable to pro-
(Continued)

tecting information security of a terminal device accessing a network.

20 Claims, 7 Drawing Sheets

(51) Int. Cl.
    *H04W 12/06*     (2009.01)
    *G06F 21/44*     (2013.01)
    *H04W 12/02*     (2009.01)
    *H04W 12/04*     (2009.01)
    *H04W 12/08*     (2009.01)

(52) U.S. Cl.
    CPC ......... *H04L 63/0823* (2013.01); *H04W 12/02* (2013.01); *H04W 12/04* (2013.01); *H04W 12/06* (2013.01); *H04W 12/08* (2013.01); *H04L 9/3236* (2013.01); *H04L 9/3242* (2013.01); *H04L 63/04* (2013.01); *H04L 63/06* (2013.01); *H04L 63/08* (2013.01)

(56) References Cited

U.S. PATENT DOCUMENTS

| 2011/0201305 | A1 | 8/2011 | Buer et al. |
| 2012/0077462 | A1* | 3/2012 | Rozensztejn ....... H04L 29/1232 455/411 |
| 2012/0144457 | A1* | 6/2012 | Counterman ......... H04L 9/3271 726/5 |
| 2013/0179692 | A1* | 7/2013 | Tolba ...................... H04L 63/08 713/179 |
| 2013/0282589 | A1* | 10/2013 | Shoup ..................... G06F 21/34 705/67 |
| 2014/0109209 | A1* | 4/2014 | Haynes ................... H04L 63/08 726/7 |
| 2014/0148123 | A1* | 5/2014 | Raleigh .................. H04L 63/20 455/406 |
| 2016/0262013 | A1* | 9/2016 | Redberg ................ H04L 63/067 |

FOREIGN PATENT DOCUMENTS

| CN | 103095457 A | 5/2013 |
| WO | 2004062243 A2 | 7/2004 |

OTHER PUBLICATIONS

Partial English Translation and Abstract of Chinese Patent Application No. CN101959183, dated Jan. 18, 2016, 8 pages.
Partial English Translation and Abstract of Chinese Patent Application No. CN103095457, dated Oct. 8, 2015, 6 pages.
Foreign Communication From a Counterpart Application, PCT Application No. PCT/CN2014/072755, English Translation of International Search Report dated May 21, 2014, 2 pages.
Foreign Communication From a Counterpart Application, PCT Application No. PCT/CN2014/072755, English Translation of Written Opinion dated May 21, 2014, 11 pages.

\* cited by examiner

METHOD, TERMINAL DEVICE, AND NETWORK DEVICE FOR IMPROVING INFORMATION SECURITY

CROSS-REFERENCE TO RELATED APPLICATIONS

This application is a continuation of International Application No. PCT/CN2014/072755, filed on Feb. 28, 2014, which claims priority to Chinese Patent Application No. 201310283912.X, filed on Jul. 8, 2013, both of which are hereby incorporated by reference in their entireties.

TECHNICAL FIELD

The present invention relates to the field of electronic information technologies, and in particular, to a method, a terminal device, and a network device for improving information security.

BACKGROUND

With the development of network technologies, a network can provide increasingly rich network services. Currently, a terminal device can implement many network services by using installed applications, for example, current common third-party applications. When the terminal device accesses a network side server directly or by using a port, an identity, such as an International Mobile Equipment Identity (IMEI) or an International Mobile Subscriber Identity (IMSI) of the terminal device is reported as a subscriber identifier, which enables the terminal device to steadily communicate with a network side server by using an interface between each application and the network side, thereby implementing an online function of each application.

However, with increasingly more applications installed on a terminal device, an identity is frequently reported when the terminal device accesses interfaces between different applications and the network side; some network side devices may, by analyzing the identity that is reported by a user by using the terminal device, track and record an activity situation and a behavioral habit about using an application by a user. For example, a user frequently uses application A and application B that are installed on a smartphone; in addition, the identity needs to be reported when the terminal device uses online functions of these applications, but some network side devices may determine, according to the identity reported by the terminal device, that application A and application B are used by a same terminal device, may read, from the network side server, communication records that the terminal device uses application A and application B, may deduce, by using a lot of common means, a behavioral profile of the user who uses the terminal device, and finally, may deduce real identity information of the user. However, once real identity information of a user is disclosed, it is prone to malicious use, which infringes individual privacy of the user.

SUMMARY

Embodiments of the present invention provide a method, a terminal device, and a network device for improving information security, which can avoid, to some extent, deducing real identity information of a user by a network side device and prevent the real identity information of the user from being disclosed, thereby protecting individual privacy of the user.

The embodiments of the present invention use the following technical solutions.

According to a first aspect, an embodiment of the present invention provides a method for improving information security, applied to a terminal device, where the method includes acquiring, by the terminal device, a key, an identity of the terminal device, and identification information of one or more applications on the terminal device, where identification information of different applications on the terminal device is different from each other, and the identity of the terminal device includes an IMEI and/or an IMSI; generating, for identification information of an application in the one or more applications by using a preset encryption algorithm according to the identity of the terminal device and the key, an encryption result corresponding to the application, where the encryption result is used to represent information that is required for the terminal device to access a network and for identification and authentication of the terminal device for network access; and when the application runs on the terminal device, accessing the network by using the encryption result corresponding to the application.

With reference to the first aspect, in a first possible implementation manner of the first aspect, the method further includes reporting the key, the identity of the terminal device, and the identification information of the one or more applications on the terminal device to the network side, where the network side includes a network device or a network side server.

With reference to the first aspect, in a second possible implementation manner of the first aspect, the preset encryption algorithm is an algorithm based on a one-way function.

According to a second aspect, an embodiment of the present invention provides a method for improving information security, applied to a network device, and including acquiring, by the network device, an original encryption result that is used when an unknown terminal device accesses a network, where the original encryption result is generated by the unknown terminal device for identification information of an application on the unknown terminal device by using a key and an identity of the unknown terminal device, and the original encryption result is used to represent information that is required for the terminal device to access the network and for identification and authentication of the terminal device for network access; generating, by using stored security information that is of each terminal device and is reported to the network device, an encryption result corresponding to each terminal device, where the security information includes parameters that are required when the encryption result corresponding to each terminal device is generated; and when an encryption result that is among the encryption results generated by the network device and is corresponding to a terminal device is the same as the original encryption result, determining that the terminal device is the unknown terminal device.

With reference to the second aspect, in a first possible implementation manner of the second aspect, the security information that is of the terminal device and is reported to the network device includes a key, an identity, a preset encryption algorithm, and identification information of one or more applications on the terminal device, wherein the identity of the terminal device includes an IMEI and/or an IMSI of the terminal device; and wherein generating, by using stored security information that is of each terminal device and is reported to the network device, an encryption result corresponding to each terminal device includes generating, by using a key and an identity of each terminal device and identification information of one or more applications on each terminal device and by means of an algorithm based on a one-way function, the encryption result corresponding to each terminal device.

According to a third aspect, an embodiment of the present invention provides a terminal device, including an information extraction module configured to acquire a key, an identity of the terminal device, and identification information of one or more applications on the terminal device, where identification information of different applications on the terminal device is different from each other, and the identity of the terminal device includes an IMEI and/or an IMSI; an encryption module configured to generate, for identification information of an application in the one or more applications by using a preset encryption algorithm according to the identity of the terminal device and the key, an encryption result corresponding to the application, where the encryption result is used to represent information that is required for the terminal device to access a network and for identification and authentication of the terminal device for network access; and a communications module configured to, when the application runs on the terminal device, access the network by using the encryption result corresponding to the application.

With reference to the third aspect, in a first possible implementation manner of the third aspect, the communications module is further configured to report the key, the identity of the terminal device, and the identification information of the one or more applications on the terminal device to the network side, where the network side includes a network device or a network side server.

With reference to the third aspect, in a second possible implementation manner of the third aspect, the encryption module is configured to generate, for identification information of one application by using the identity of the terminal device and the key and by means of an algorithm based on a one-way function, an encryption result corresponding to the application.

According to a fourth aspect, an embodiment of the present invention provides a network device, including a receiving module configured to acquire an original encryption result that is used when an unknown terminal device accesses a network, where the original encryption result is generated by the unknown terminal device for identification information of an application on the unknown terminal device by using a key and an identity of the unknown terminal device, and the original encryption result is used to represent information that is required for the terminal device to access the network and for identification and authentication of the terminal device for network access; a processing module configured to generate, by using stored security information that is of each terminal device and is reported to the network device, an encryption result corresponding to each terminal device, where the security information includes parameters that are required when the encryption result corresponding to each terminal device is generated; and an identification module configured to, when an encryption result that is among the encryption results generated by the network device and is corresponding to a terminal device is the same as the original encryption result, determine that the terminal device is the unknown terminal device.

With reference to the fourth aspect, in a first possible implementation manner of the fourth aspect, the security information that is of the terminal device and is reported to the network device includes a key, an identity, a preset encryption algorithm, and identification information of one or more applications on the terminal device, wherein the identity of the terminal device includes an IMEI and/or an IMSI of the terminal device; and wherein the processing module is configured to generate, by using a key and an identity of each terminal device and identification information of one or more applications on each terminal device and by means of an algorithm based on a one-way function, the encryption result corresponding to each terminal device.

According to the method, the terminal device, and the network device for improving information security provided in the embodiments of the present invention, the terminal device can generate an encryption result corresponding to each application, and an encryption result that is used when one application running on the terminal device accesses a network is different from an encryption result that is used when another application accesses the network, so that information that is used for identifying the terminal device and is sent to a network side when different applications run on the terminal device is different. Compared with the prior art, the embodiments of the present invention have the following advantages: because information that is used for identifying the terminal device and is sent when different applications run on the terminal device is different, it is difficult for the network side to obtain a behavioral profile of a user by cross-analyzing communication records that different applications run on a same terminal device, which avoids deducing real identity information of the user by a network side device and prevents the real identity information of the user from being disclosed, thereby protecting individual privacy of the user.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely some but not all of the embodiments of the present invention. All other embodiments obtained by a person of ordinary skill in the art based on the embodiments of the present invention without creative efforts shall fall within the protection scope of the present invention.

Figure 1:
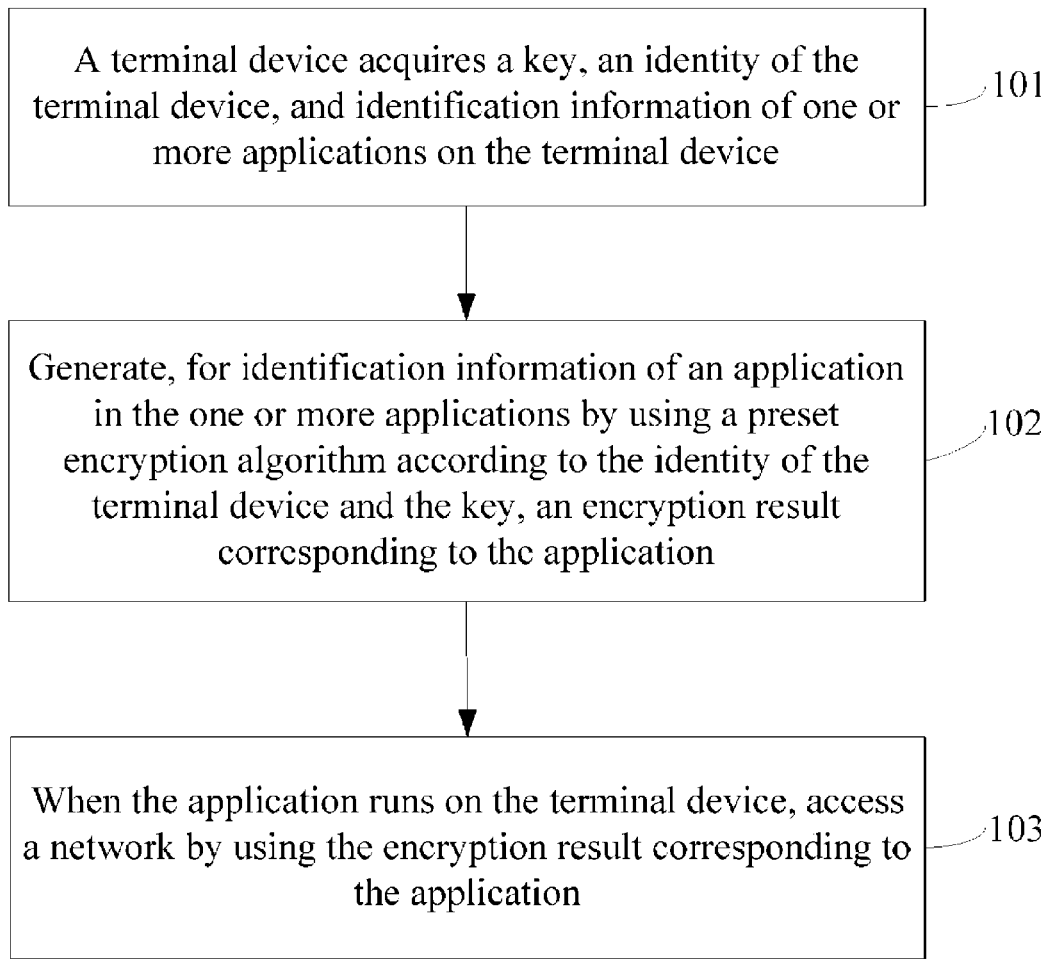
FIG. 1 is a flowchart of a method for improving information security according to an embodiment of the present invention.

An embodiment of the present invention provides a method for improving information security. As shown in FIG. 1, the method includes the following steps.

101: A terminal device acquires a key, an identity of the terminal device, and identification information of one or more applications on the terminal device.

Identification information of different applications on the terminal device is different from each other, and the identity of the terminal device may include an IMEI and/or an IMSI.

In this embodiment, the key corresponding to the terminal device may be a key that is automatically generated after the terminal device is powered on, or may be a key that is input by a user or sent by another device. Identification information of an application may be information, such as a Package Name of the application, certificate information carried in the application, a primary key in certificate information carried in the application or a signature in a certificate, user identification (UID) of the application, and/or the like.

102: Generate, for identification information of an application in the one or more applications by using a preset encryption algorithm according to the identity of the terminal device and the key, an encryption result corresponding to the application.

The encryption result is used to represent information that is required for the terminal device to access a network and for identification and authentication of the terminal device for network access.

It should be noted that, in this embodiment, a network side includes a device, such as a base station, a gateway, or a data server, capable of performing data exchange with the terminal device by using the network. In addition, in a practical application, the terminal device may send, to the network side, information used for identifying the terminal device. For example, a third-party application (APP) installed on a smartphone may read device information of the smartphone by using an application programming interface (API) provided by an operating system carried by the smartphone, and when using an online function in a running process or needing to perform data exchange with the network side, the APP may import the device information, as information used for identifying the smartphone, to a to-be-transmitted data block and send the data block to the network side by using a communications module of the smartphone, so that the information used for identifying the smartphone is sent to the network side. Therefore, a network side server, for example, a server of an APP provider, may implement, according to the information used for identifying the terminal device, registration of the terminal device on the network, thereby ensuring that the terminal device can steadily communicate with network side servers by using interfaces between applications and the servers.

In this embodiment, the preset encryption algorithm may also be a common function algorithm. For example, the terminal device may perform weighted value calculation on parameters involved in encryption calculation to acquire a weighted value calculation result, convert, by using a number system conversion technology, the weighted value calculation result to string code that is of a same form as an IMEI or an IMSI, and acquire, by means of truncation from the string code, code that has a same length as the IMEI or the IMSI as the encryption result.

The preset encryption algorithm may also be an algorithm based on a one-way function, for example, a hash function. In addition, a generated encryption result is corresponding to an application on the terminal device. For example, a manner in which the terminal device generates the encryption result may be: V=HASH (APP_INFO⊕Value⊕K), where APP_INFO represents identification information of the application; V represents the encryption result; and HASH represents a one-way function, which may be manifested in multiple function forms in a practical application, such as message-digest 5 (MD5) and Secure Hash Algorithm 1 (SHA-1). Because the one-way function has a one-way characteristic, it is hard to carry out, for a result of encryption calculation, a means such as an inverse operation or inverse analysis that can be used for crack calculation; therefore, using a function with a one-way characteristic to perform encryption calculation can improve security of information encryption. Value represents an identity of the terminal device; K represents a key generated by the terminal device; and ⊕ represents a logical operation manner well known by a person skilled in the art, for example, represents a string connection, bitwise exclusive-OR, or summation operation. It should be noted that ⊕ represents a specific logical operation manner of each parameter in the preset encryption algorithm. In a practical application of this embodiment, a symbol representing a logical calculation manner may also be a self-defined symbol, such as ⊖, #, or &, or may be a common logical operation symbol in the art, such as @ or &. That is, the symbol representing a specific logical operation manner of each parameter in the preset encryption algorithm is not limited to ⊕.

103: When the application runs on the terminal device, access a network by using the encryption result corresponding to the application.

An encryption result that is used for network access when an application runs on the terminal device is different from an encryption result that is used for network access when another application runs on the terminal device.

In a practical application, the IMEI and the IMSI are stored and transmitted in a form of a character string, and after the terminal device reports an identity to the network side, the network side may perform, upon receipt, a specific application procedure, such as registration and recording, on a server for the terminal device by using the identity.

In this embodiment, the terminal device may use an encryption result as an identity during an actual application and access a network by using the encryption result. For example, the terminal device may obtain an encryption result V, where V is also saved in the terminal device in a form of a character string; and then, the terminal device may substitute V for an identity and report V to the network side, so that the network side uses V, reported by the terminal device, as a character string that is used for identifying the terminal device, and thereby, the terminal device can use V to access the network. It should be noted that, because what is reported by the terminal device in a practical application is actually a character string that is used for identifying the terminal device, the encryption result V may be sent to the network side in a same manner in which the IMEI or the IMSI is reported; moreover, because what is processed by the network side in a practical application is also actually a character string that is used for identifying the terminal device, after receiving V, the network side may process V in a same manner in which the IMEI or the IMSI is processed, and thereby, the terminal device can use the encryption result V to access the network.

It should be noted that encryption results that are used for network access when different applications run on the terminal device are also different. For example, when application A runs on the terminal device and the terminal device uses an online function of application A, the terminal device may access the network by using an encryption result $V_A$ corresponding to application A; when application B runs on the terminal device and the terminal device uses an online function of application B, the terminal device may access the network by using an encryption result $V_B$ corresponding to application B; when application C runs on the terminal device and the terminal device uses an online function of application C, the terminal device may access the network by using an encryption result $V_C$ corresponding to application C; and in this embodiment, $V_A$, $V_B$, and $V_C$ are different from each another.

According to the method for improving information security provided in this embodiment of the present invention, a terminal device can generate an encryption result corresponding to each application, and an encryption result that is used when one application running on the terminal device accesses a network is different from an encryption result that is used when another application accesses the network, so that information that is used for identifying the terminal device and is sent to a network side when different applications run on the terminal device is different. Compared with the prior art, this embodiment of the present invention has the following advantages: because information that is used for identifying the terminal device and is sent when different applications run on the terminal device is different, it is difficult for the network side to obtain a behavioral profile of a user by cross-analyzing communication records that different applications run on a same terminal device, which avoids deducing real identity information of the user by a network side device and prevents the real identity information of the user from being disclosed, thereby protecting individual privacy of the user.

Figure 2:
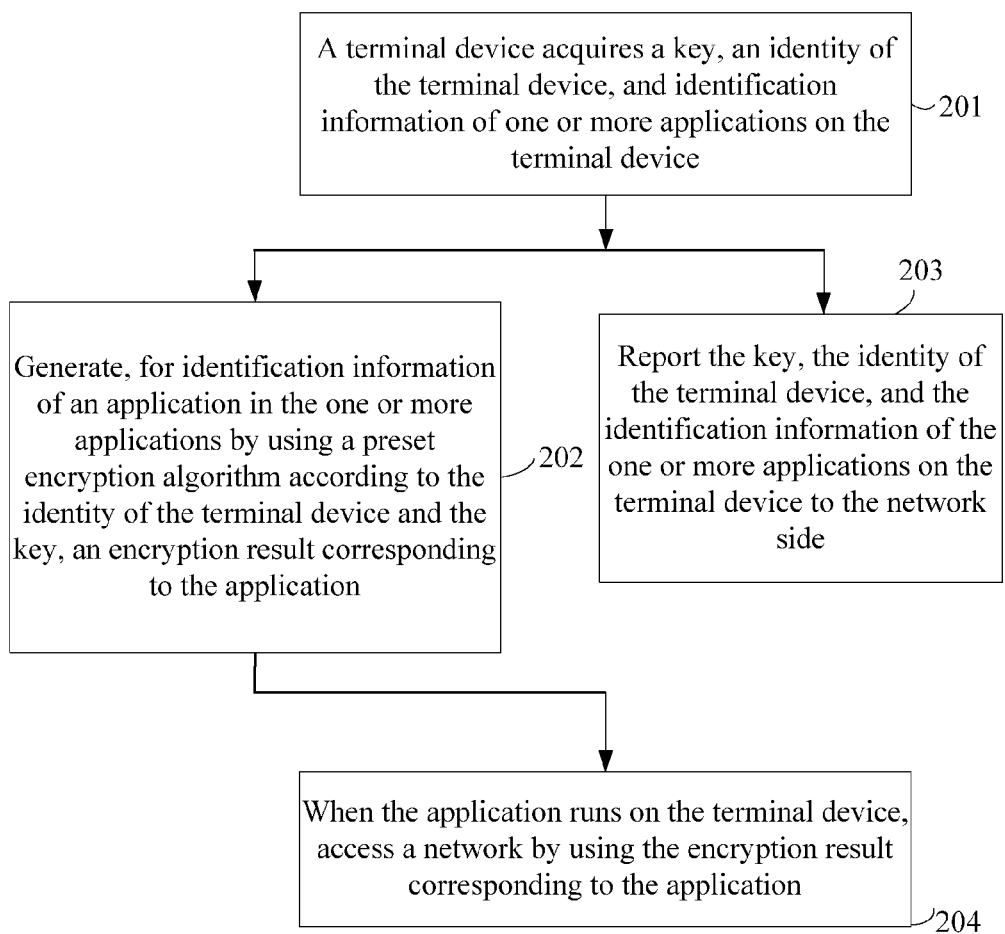
FIG. 2 is another flowchart of a method for improving information security according to an embodiment of the present invention.

Optionally, this embodiment further provides a method for improving information security. As shown in FIG. 2, the method includes the following steps.

201: A terminal device acquires a key, an identity of the terminal device, and identification information of one or more applications on the terminal device.

Identification information corresponding to different applications on the terminal device is different from each other. Optionally, the terminal device may also acquire identification information of each application.

In this embodiment, identification information of an application may be information, such as a Package Name of the application, certificate information carried in the application, a primary key in certificate information carried in the application or a signature in a certificate, UID of the application, and/or the like, well known by a person skilled in the art. In addition, identification information of different applications on the terminal device is different from each other. For example, as is well known by a person skilled in the art, the Package Name, UID, certificate information, and the like of any application on a terminal device are different from those of any another application on the terminal device.

202: Generate, for identification information of an application in the one or more applications by using a preset encryption algorithm according to the identity of the terminal device and the key, an encryption result corresponding to the application.

For example, a manner in which the terminal device generates the encryption result may be: V=HASH (APP_INFO⊕Value⊕I⊕K), where I represents a preset fixed value, and no matter which application runs, the terminal device uses a same fixed value. For example, I=1. Then, the manner in which the terminal device generates the encryption result is: V=HASH (APP_INFO⊕Value⊕1⊕K).

Alternatively, each application on the terminal device is corresponding to a fixed value, and fixed values corresponding to different applications are different from each other. For example, application A is corresponding to a fixed value 0, application B is corresponding to a fixed value 1, and application C is corresponding to a fixed value 2. The terminal device may generate an encryption result, $V_A$=HASH (APP_INFO⊕Value⊕0⊕K), corresponding to application A, an encryption result, $V_B$=HASH (APP_INFO⊕Value⊕1⊕K), corresponding to application B, and an encryption result, $V_C$=HASH (APP_INFO⊕Value⊕2⊕K), corresponding to application C.

It should be noted that, in a practical application, an identity, such as an IMEI or an IMSI, reported to the network side by the terminal device is generally a 15-place decimal number, but specifically, is stored in a form of a binary number in the terminal device. For example, a 15-place decimal number may be converted to a binary string with a specified length, for example, a 45-bit binary string, for storage. In this embodiment, when a length of an encryption result string acquired by the terminal device is greater than a specified length, the terminal device may acquire, by means of truncation, a binary string with a specified length, for example, 45 bits, convert the acquired binary string with the specified length to a 15-place decimal number, and report the 15-place decimal number to the network side as a string used for identifying the terminal device.

203: Report the key, the identity of the terminal device, and the identification information of the one or more applications on the terminal device to the network side.

The network side includes a network device or a network side server.

After the terminal device acquires the key and the identity of the terminal device, and the identification information of the one or more application, 203 may be performed. That is, 203 and 202 may be performed simultaneously, or 203 may be performed after 202.

In this embodiment, after determining the key, the identity of the terminal device, and the identification information of the one or more application on the terminal device, the terminal device may report the information to the network side as security information; and the network side may store the security information reported by the terminal device in a storage device that can ensure information security. For example, the network side may store the security information reported by the terminal device in a third-party database, such as a database of a network regulator or a backup database of an operator, that is highly trustable or cannot be freely accessed before due authorization is acquired.

204: When the application runs on the terminal device, access a network by using the encryption result corresponding to the application.

For example, when application A runs on the terminal device and the terminal device uses an online function of application A, the terminal device may access the network by using an encryption result $V_A$ corresponding to application A; when application B runs on the terminal device and the terminal device uses an online function of application B, the terminal device may access the network by using an encryption result $V_B$ corresponding to application B; when application C runs on the terminal device and the terminal device uses an online function of application C, the terminal device may access the network by using an encryption result $V_C$ corresponding to application C; and in this embodiment, $V_A$, $V_B$, and $V_C$ are different from each another.

According to the method for improving information security provided in this embodiment of the present invention, a terminal device can generate an encryption result corresponding to each application, and an encryption result that is used when one application running on the terminal device accesses a network is different from an encryption result that is used when another application accesses the network, so that information that is used for identifying the terminal device and is sent to a network side when different applications run on the terminal device is different. Compared with the prior art, this embodiment of the present invention has the following advantages: because information that is used for identifying the terminal device and is used when different applications run on the terminal device is different, it is difficult for the network side to obtain a behavioral profile of a user by cross-analyzing communication records that different applications run on a same terminal device, which avoids deducing real identity information of the user by a network side device and prevents the real identity information of the user from being disclosed, thereby protecting individual privacy of the user.

Figure 3:
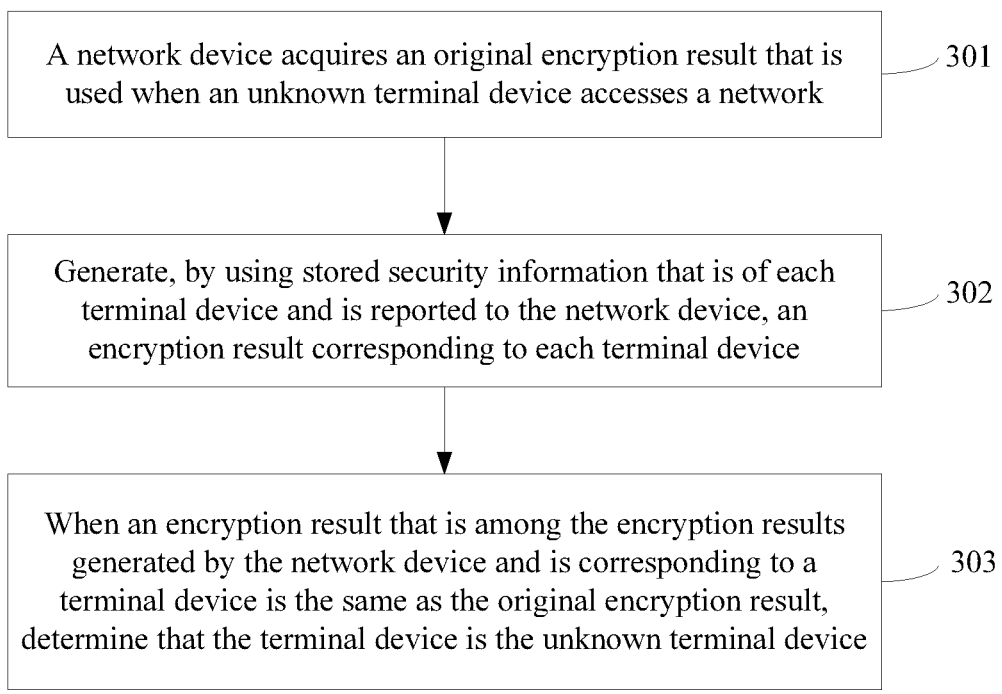
FIG. 3 is a flowchart of another method for improving information security according to an embodiment of the present invention.

An embodiment of the present invention further provides another method for improving information security, which can be applied to a network device. It should be noted that a network device in this embodiment may be a device, on a network side, that can communicate with a terminal device, and the network device stores security information of at least two terminal devices. The security information of the terminal device includes a key, an identity, a preset encryption algorithm, and identification information of one or more applications on the terminal device that are reported to the network device by the terminal device; the identity of the terminal device includes an IMEI and/or an IMSI. As shown in FIG. 3, the method may include the following steps.

301: The network device acquires an original encryption result that is used when an unknown terminal device accesses a network.

The original encryption result is generated by the unknown terminal device for identification information of an application on the unknown terminal device by using a key and an identity of the unknown terminal device. The preset encryption algorithm is an algorithm based on a one-way function, and the original encryption result is used to represent information that is required for the terminal device to access the network and for identification and authentication of the terminal device for network access.

It may be known from the solution executed by a terminal device in this embodiment that, when the terminal device accesses the network, a result generated by means of encryption calculation by the terminal device is used. For example, in this embodiment, the original encryption result used when the unknown terminal device accesses the network, rather than the original IMEI or IMSI of the terminal device. When one terminal device accesses the network by using a generated encryption result, because the network device has not recorded a correspondence between the terminal device and the encryption result generated by the terminal device, the network device cannot identify the terminal device accessing the network. For the network device, the terminal device is an unknown terminal device.

302: Generate, by using stored security information that is of each terminal device and is reported to the network device, an encryption result corresponding to each terminal device.

The security information includes parameters that are required when the encryption result corresponding to each terminal device is generated. In this embodiment, the security information that is of a terminal device and is reported to the network device, including a key, an identity, a preset encryption algorithm, and identification information of one or more applications on the terminal device, and the identity of the terminal device includes an IMEI and/or an IMSI. Therefore, in this embodiment, 302 may be implemented as generating, by using a key and an identity of each terminal device and identification information of one or more applications on each terminal device and by means of an algorithm based on a one-way function, the encryption result corresponding to each terminal device.

It may be known from the solution executed by a terminal device in this embodiment that, the terminal device accesses a network by using a key and an identity of the terminal device, identification information of an application, and the like as parameters and by using an encryption result that is generated by using a preset encryption algorithm and an encryption result generated by the terminal device, thereby avoiding accessing a network by using an IMEI or an IMSI of a terminal device as in the prior art.

In this embodiment, because the security information stored in the network device includes parameters, such as a key and a preset identity of each terminal device, and a preset encryption algorithm that is used when each terminal device generates an encryption result is also stored, the network device can generate the encryption result corresponding to each terminal device by using the stored security information corresponding to each terminal device.

303: When an encryption result that is among the encryption results generated by the network device and is corresponding to a terminal device is the same as the original encryption result, determine that the terminal device is the unknown terminal device.

For example, application a, application b, and application c are installed on terminal device 1, and identification information of application a is $APP\_INFO_a$. Then, the terminal device 1 may send an encryption result $V_a$ to a network side when using an online function of application a, where $V_a$=HASH ($APP\_INFO_a \oplus Value \oplus I \oplus K$); the terminal device may send an encryption result $V_b$ to the network side when using an online function of application b, where $V_b$=HASH ($APP\_INFO_b \oplus Value \oplus I \oplus K$); and the terminal device may send an encryption result $V_c$ to the network side when using an online function of application c, where $V_c$=HASH ($APP\_INFO_c \oplus Value \oplus I \oplus K$). Security information that is corresponding to the terminal device and is stored by the network device may further include $APP\_INFO_a$, $APP\_INFO_b$, and $APP\_INFO_c$, so that the network device may generate an encryption result that is the same as $V_a$, $V_b$, or $V_c$. When an original encryption result that is actually used when an unknown terminal device accesses the network is the same as any one of $V_a$, $V_b$, and $V_c$, it may be determined that the unknown terminal device is terminal device 1.

According to the method for improving information security provided in this embodiment of the present invention, a terminal device can generate an encryption result corresponding to each application, and an encryption result that is used when one application running on the terminal device accesses a network is different from an encryption result that is used when another application accesses the network, so that information that is used for identifying the terminal device and is sent to a network side when different applications run on the terminal device is different. Compared with the prior art, this embodiment of the present invention has the following advantages: because information that is used for identifying the terminal device and is used when different applications run on the terminal device is different, it is difficult for the network side to obtain a behavioral profile of a user by cross-analyzing communication records that different applications run on a same terminal device. If a correct terminal device needs to be traced from a network side according to information that is used for identifying a terminal device and is sent by the terminal device, the network device needs to acquire security information including parameters such as a key, for example, a key, and a preset identity of the terminal device, and use the same preset encryption algorithm as that of the terminal device, to correctly identify the terminal device accessing the network. Therefore, it is difficult for a device that does not have the security information on the network side to trace the correct terminal device, which avoids deducing real identity information of a user by a network side device and prevents the real identity information of the user from being disclosed, thereby protecting individual privacy of the user.

Figure 4:
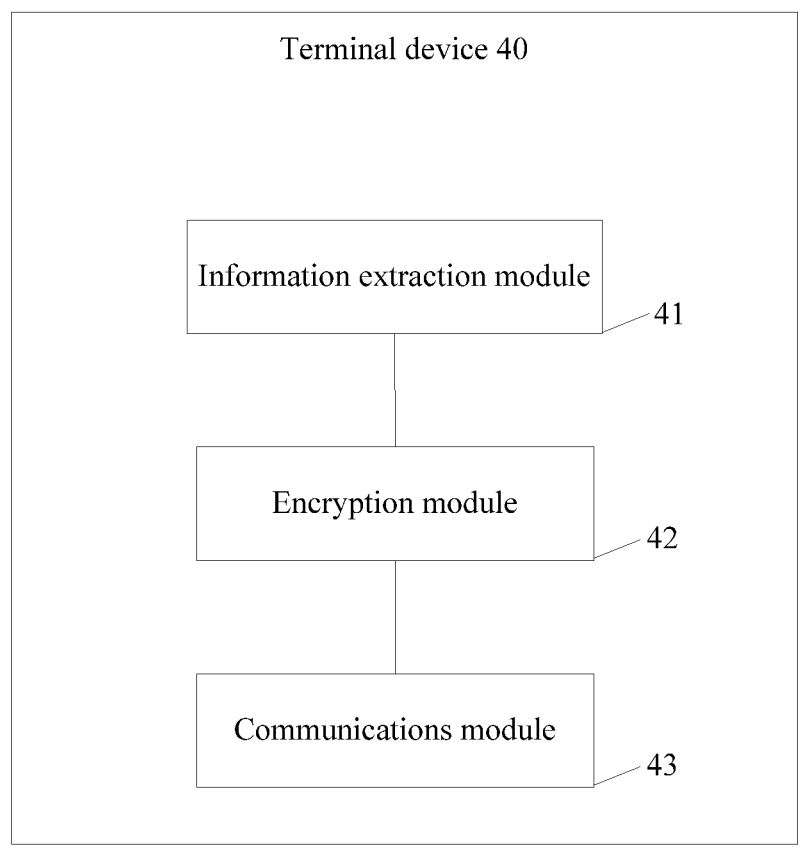
FIG. 4 is a schematic structural diagram of a terminal device according to an embodiment of the present invention.

An embodiment of the present invention provides a terminal device 40 for improving information security. As shown in FIG. 4, the terminal device 40 may include an information extraction module 41, an encryption module 42, and a communications module 43.

The information extraction module 41 is configured to acquire a key, an identity of the terminal device, and identification information of one or more applications on the terminal device.

Identification information of different applications on the terminal device is different from each other, and the identity of the terminal device includes an IMEI and/or an IMSI.

The encryption module 42 is configured to generate, for identification information of an application in the one or more applications by using a preset encryption algorithm according to the identity of the terminal device, an encryption result corresponding to the application.

The encryption result is used to represent information that is required for the terminal device to access a network and for identification and authentication of the terminal device for network access.

Optionally, the encryption module 42 is configured to generate, for identification information of one application by using the identity of the terminal device and the key and by means of an algorithm based on a one-way function, an encryption result corresponding to the application.

The communications module 43 is configured to, when the application runs on the terminal device, access the network by using the encryption result corresponding to the application.

Optionally, the communications module 43 is further configured to report the key, the identity of the terminal device, and the identification information of the one or more applications on the terminal device to the network side.

The network side includes a network device or a network side server.

The terminal device for improving information security provided in this embodiment of the present invention can generate an encryption result corresponding to each application, and an encryption result that is used when one application running on the terminal device accesses a network is different from an encryption result that is used when another application accesses the network, so that information that is used for identifying the terminal device and is sent to a network side when different applications run on the terminal device is different. Compared with the prior art, this embodiment of the present invention has the following advantages: because information that is used for identifying the terminal device and is sent when different applications run on the terminal device is different, it is difficult for the network side to obtain a behavioral profile of a user by cross-analyzing communication records that different applications run on a same terminal device, which avoids deducing real identity information of the user by a network side device and prevents the real identity information of the user from being disclosed, thereby protecting individual privacy of the user.

Figure 5:
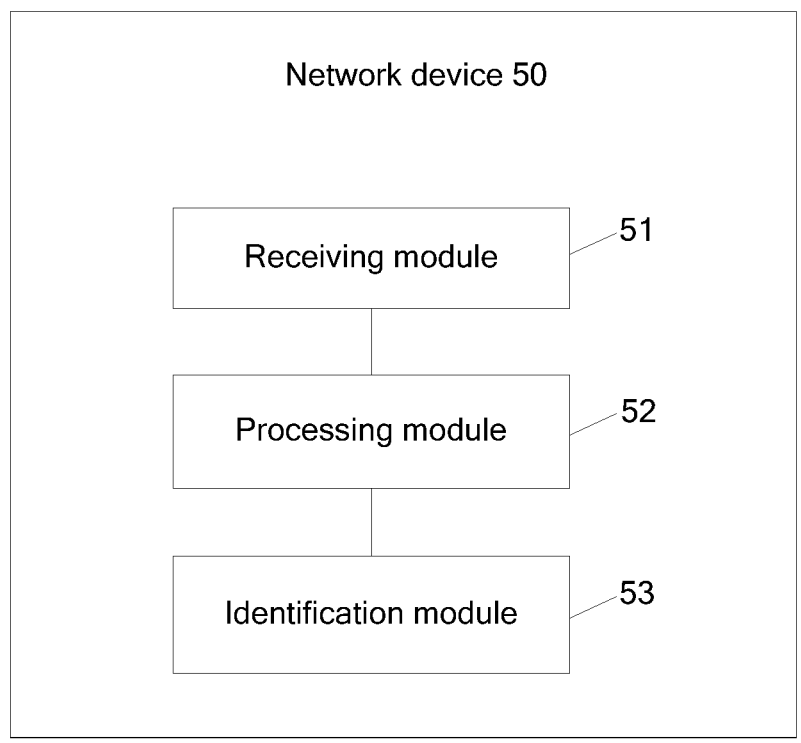
FIG. 5 is a schematic structural diagram of a network device according to an embodiment of the present invention.

An embodiment of the present invention provides a network device 50 for improving information security. As shown in FIG. 5, the network device 50 may include a receiving module 51, a processing module 52, and an identification module 53.

The receiving module 51 is configured to acquire an original encryption result that is used when an unknown terminal device accesses a network, where the original encryption result is generated by the unknown terminal device for identification information of an application on the unknown terminal device by using a key and an identity of the unknown terminal device, and the original encryption result is used to represent information that is required for the terminal device to access the network and for identification and authentication of the terminal device for network access;

It should be noted that the security information of the terminal device includes a key, an identity, a preset encryption algorithm, and identification information of one or more applications on the terminal device that are reported by the terminal device to the network device 50, and the identity of the terminal device includes an IMEI and/or an IMSI of the terminal device.

The processing module 52 is configured to generate, by using stored security information that is of each terminal device and is reported to the network device, an encryption result corresponding to each terminal device, where the security information includes parameters that are required when the encryption result corresponding to each terminal device is generated.

The identification module 53 is configured to, when an encryption result that is among the encryption results generated by the network device and is corresponding to a terminal device is the same as the original encryption result, determine that the terminal device is the unknown terminal device.

The security information that is of the terminal device and is reported to the network device includes a key, an identity, a preset encryption algorithm, and identification information of one or more applications on the terminal device, where the identity of the terminal device includes an IMEI and/or an IMSI of the terminal device.

Optionally, the processing module 52 is configured to generate, by using a key and an identity of each terminal device and identification information of one or more applications on each terminal device and by means of an algorithm based on a one-way function, the encryption result corresponding to each terminal device.

Because a terminal device can generate an encryption result corresponding to each application, and an encryption result that is used when one application running on the terminal device accesses a network is different from an encryption result that is used when another application accesses the network, so that information that is used for identifying the terminal device and is sent to a network side when different applications run on the terminal device is different. Compared with the prior art, this embodiment of the present invention has the following advantages: because information that is used for identifying the terminal device and is sent when different applications run on the terminal device is different, it is difficult for the network side to obtain a behavioral profile of a user by cross-analyzing communication records that different applications run on a same terminal device. According to the network device for improving information security provided in this embodiment of the present invention, a correct terminal device can be traced from a network side according to information that is used for identifying a terminal device and is sent by the terminal device. The network device needs to acquire security information including parameters such as a key, for example, a key, and a preset identity of the terminal device, and use the same preset encryption algorithm as that of the terminal device, to correctly identify the terminal device accessing the network. Therefore, it is difficult for a device that does not has the security information on the network side to trace the correct terminal device, which avoids deducing real identity information of a user by a network side device and prevents the real identity information of the user from being disclosed, thereby protecting individual privacy of the user.

Figure 6:
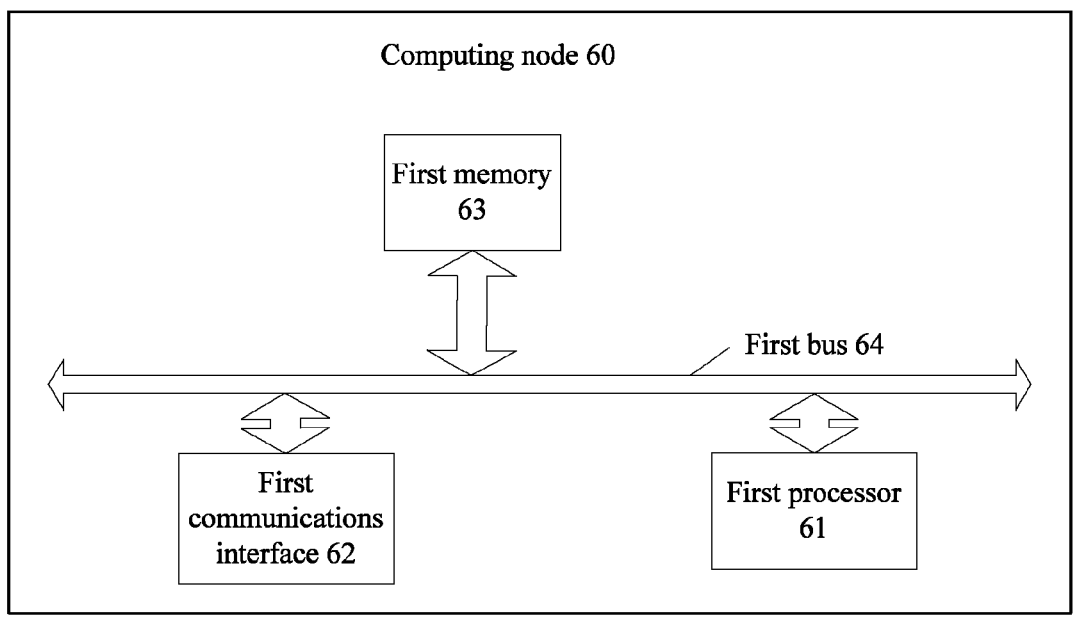
FIG. 6 is a schematic structural diagram of a computing node according to an embodiment of the present invention.

An embodiment of the present invention further provides a computing node 60, where the computing node 60 may be applied to a terminal device. As shown in FIG. 6, the computing node 60 includes a first processor 61, a first communications interface 62, a first memory 63, and a first bus 64. The first processor 61, the first communications interface 62, and the first memory 63 implement mutual communication by using the first bus 64. The first memory 63 is configured to store data that needs to be stored by the computing node 60 in a running process.

The first processor 61 is configured to acquire, by using the first communications interface 62, a key, an identity of the terminal device, and identification information of one or more applications on the terminal device.

Identification information of different applications on the terminal device is different from each other, and the identity of the terminal device includes an IMEI and/or an IMSI.

The first processor 61 is further configured to generate, for identification information of an application in the one or more applications by using a preset encryption algorithm according to the identity of the terminal device and the key, an encryption result corresponding to the application.

The encryption result is used to represent information that is required for the terminal device to access a network and for identification and authentication of the terminal device for network access.

The preset encryption algorithm may be an algorithm based on a one-way function.

The first processor 61 is further configured to, when the terminal device runs the application, access the network by using the encryption result corresponding to the application.

Optionally, the first processor 61 is further configured to report, by using the first communications interface 62, the key, the identity of the terminal device, and the identification information of the one or more applications on the terminal device to the network side, where the network side includes a network device or a network side server.

The first processor 61 is configured to generate, for identification information of one application by using the identity of the terminal device and the key and by means of an algorithm based on a one-way function, an encryption result corresponding to the application.

The computing node for improving information security provided in this embodiment of the present invention can generate an encryption result corresponding to each application, and an encryption result that is used when one application running on a terminal device accesses a network is different from an encryption result that is used when another application accesses the network, so that information that is used for identifying the terminal device and is sent to a network side when different applications run on the terminal device is different. Compared with the prior art, this embodiment of the present invention has the following advantages: because information that is used for identifying the terminal device and is used when different applications run on the terminal device is different, it is difficult for the network side to obtain a behavioral profile of a user by cross-analyzing communication records that different applications run on a same terminal device, which avoids deducing real identity information of the user by a network side device and prevents the real identity information of the user from being disclosed, thereby protecting individual privacy of the user.

Figure 7:
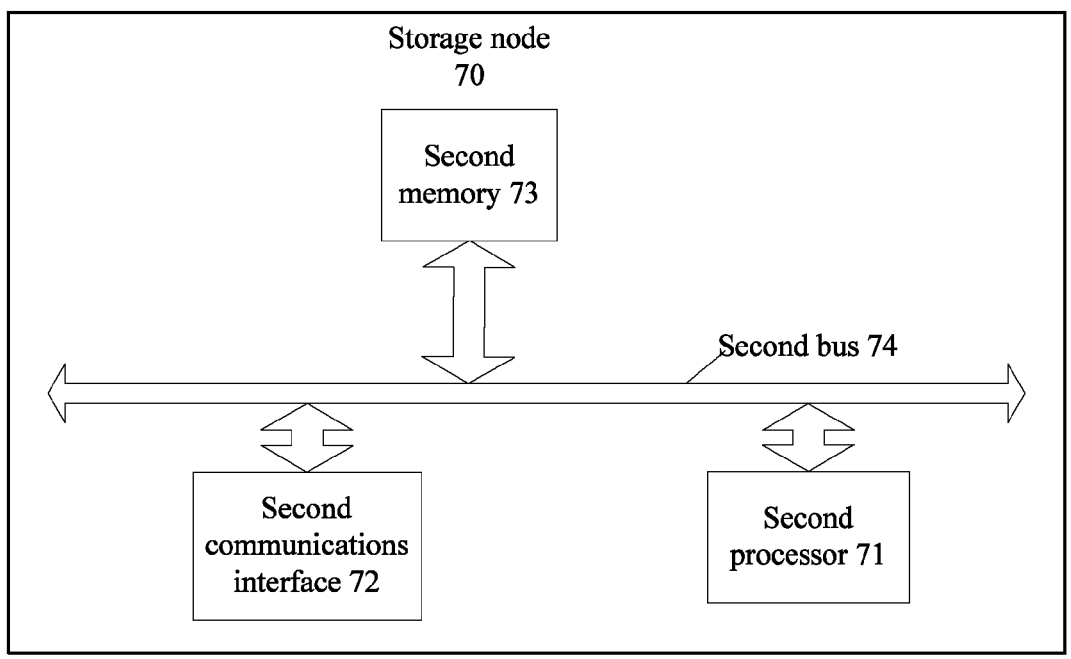
FIG. 7 is a schematic structural diagram of a storage node according to an embodiment of the present invention.

An embodiment of the present invention further provides a storage node 70, where the storage node 70 may be applied to a network device. As shown in FIG. 7, the storage node 70 includes a second processor 71, a second communications interface 72, a second memory 73, and a second bus 74. The second processor 71, the second communications interface 72, and the second memory 73 implement mutual communication by using the second bus 74. The second memory 73 is configured to store data that needs to be stored by the storage node 70 in a running process.

The second memory 73 is further configured to store security information reported by a terminal device.

The security information may include a key, an identity, a preset encryption algorithm, and identification information of one or more applications on the terminal device, where the identity of the terminal device includes an IMEI and/or an IMSI of the terminal device.

The second processor 71 is configured to acquire an original encryption result that is used when an unknown terminal device accesses a network.

The original encryption result is generated by the unknown terminal device for identification information of an application on the unknown terminal device by using a key and an identity of the unknown terminal device, and the original encryption result is used to represent information that is required for the terminal device to access the network and for identification and authentication of the terminal device for network access.

The second processor 71 is further configured to generate, by using security information of each terminal device stored in the second memory 73, an encryption result corresponding to each terminal device, where the security information includes parameters that are required when the encryption result corresponding to each terminal device is generated.

The second processor 71 is further configured to, when an encryption result that is among the encryption results generated by the network device and is corresponding to a terminal device is the same as the original encryption result, determine that the terminal device is the unknown terminal device.

Further, the second processor 71 may be configured to generate, by using a key and an identity of each terminal device and identification information of one or more applications on each terminal device and by means of an algorithm based on a one-way function, the encryption result corresponding to each terminal device.

According to the storage node for improving information security provided in this embodiment of the present invention, a terminal device can generate an encryption result corresponding to each application, and an encryption result that is used when one application running on the terminal device accesses a network is different from an encryption result that is used when another application accesses the network, so that information that is used for identifying the terminal device and is sent to a network side when different applications run on the terminal device is different. Compared with the prior art, this embodiment of the present invention has the following advantages: because information that is used for identifying the terminal device and is sent when different applications run on the terminal device is different, it is difficult for the network side to obtain a behavioral profile of a user by cross-analyzing communication records that different applications run on a same terminal device. If a correct terminal device needs to be traced from a network side according to information that is used for identifying a terminal device and is sent by the terminal device, the network device needs to acquire security information including parameters such as a key, for example, a key, and a preset identity of the terminal device, and use the same preset encryption algorithm as that of the terminal device, to correctly identify the terminal device accessing the network. Therefore, it is difficult for a device, on the network side, that does not has the security information to trace the correct terminal device, which avoids deducing real identity information of a user by a network side device and prevents the real identity information of the user from being disclosed, thereby protecting individual privacy of the user.

The embodiments in this specification are all described in a progressive manner. Mutual reference may be made for same or similar parts in the embodiments, and each embodiment focuses on a difference from other embodiments. Especially, a device embodiment is basically similar to a method embodiment, and therefore is described briefly; and for related parts, reference is made to the part of description in the method embodiment.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The storage medium may include a magnetic disk, an optical disc, a read-only memory (ROM), or a random access memory (RAM).

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for improving information security, applied to a terminal device, wherein the method comprises:
   acquiring, by the terminal device, a key, an identity of the terminal device, and identification information of at least one application on the terminal device, wherein identification information of different applications on the terminal device is different from each other, and wherein the identity of the terminal device comprises at least one of an International Mobile Equipment Identity (IMEI) and an International Mobile Subscriber Identity (IMSI);
   generating, for identification information of one of the applications, an encryption result corresponding to the application using a preset encryption algorithm according to the identity of the terminal device and the key, wherein the encryption result is used to represent information that is required for the terminal device to access a network and for identification and authentication of the terminal device for network access;
   accessing the network using the encryption result corresponding to the application when the application runs on the terminal device; and
   accessing the network using another encryption result corresponding to another application when the another application runs on the terminal device, the another encryption result generated for identification information of the another application, and using the preset encryption algorithm according to the identity of the terminal device and the key,
   wherein the encryption result and the another encryption result are different from each other, and
   wherein both the encryption result and the another encryption result are used by the terminal device to access the same network.

2. The method for improving information security according to claim 1, further comprising reporting the key, the identity of the terminal device, and the identification information of the at least one application on the terminal device to the network, wherein a network side comprises at least one of a network device and a network side server.

3. The method for improving information security according to claim 1, wherein the preset encryption algorithm is an algorithm based on a one-way function.

4. A method for improving information security, applied to a network device, wherein the method comprises:
   acquiring, by the network device, an original encryption result that is used when an unknown terminal device accesses a network, wherein the original encryption result is generated by the unknown terminal device for identification information of an application on the unknown terminal device by using a key and an identity of the unknown terminal device using a preset encryption algorithm, and wherein the original encryption result is used to represent information that is required for the unknown terminal device to access the network and for identification and authentication of the unknown terminal device for network access;
   generating, using stored security information that is of each of a plurality of terminal devices and is reported to the network device, an encryption result corresponding to each terminal device, wherein the security information comprises parameters that are required when generating encryption results, wherein each encryption result from among the encryption results corresponds to a specific terminal device;
   determining that a terminal device is the unknown terminal device when an encryption result that is among the encryption results generated by the network device and is corresponding to the terminal device is the same as the original encryption result, and
   wherein an encryption result is different for each application on the terminal device such that the terminal device generates a different encryption result depending on identification information of each application the terminal device uses to access the network.

5. The method for improving information security according to claim 4, wherein the security information that is of the terminal device and is reported to the network device comprises a key, an identity, a preset encryption algorithm, and identification information of at least one application on the terminal device, and wherein the identity of the terminal device comprises at least one of an International Mobile Equipment Identity (IMEI) and an International Mobile Subscriber Identity (IMSI) of the terminal device, and wherein generating, by using stored security information that is of each terminal device and is reported to the network device, the encryption result corresponding to each terminal device comprises generating, using a key and an identity of each terminal device and identification information of at least one application on each terminal device and by means of an algorithm based on a one-way function, the encryption result corresponding to each terminal device.

6. A terminal device, comprising:
a memory comprising instructions; and
a computer processor coupled to the memory, wherein the instructions cause the memory to be configured to:
acquire a key, an identity of the terminal device, and identification information of at least one application on the terminal device, wherein identification information of different applications on the terminal device is different from each other, and wherein the identity of the terminal device comprises a least one of an International Mobile Equipment Identity (IMEI) and an International Mobile Subscriber Identity (IMSI);
generate, for identification information of one of the applications, an encryption result corresponding to the application using a preset encryption algorithm according to the identity of the terminal device and the key, wherein the encryption result is used to represent information that is required for the terminal device to access a network and for identification and authentication of the terminal device for network access;
access the network by using the encryption result corresponding to the application when the application runs on the terminal device;
access the network using another encryption result corresponding to another application when the another application runs on the terminal device, the another encryption result generated for identification information of the another application, and using the preset encryption algorithm according to the identity of the terminal device and the key,
wherein the encryption result and the another encryption result are different from each other, and
wherein both the encryption result and the another encryption result are used by the terminal device to access the same network.

7. The terminal device according to claim 6, wherein the instructions further cause the computer processor to be configured to report the key, the identity of the terminal device, and the identification information of the at least one application on the terminal device to a network side, and wherein the network side comprises at least one of a network device and a network side server.

8. The terminal device according to claim 6, wherein the instructions further cause the computer process to be configured to generate, for identification information of one of the applications, an encryption result corresponding to the application using the identity of the terminal device and the key and by means of an algorithm based on a one-way function.

9. A network device, wherein the network device comprises:
a memory comprising instructions; and
a computer processor coupled to the memory, wherein the instructions cause the memory to be configured to:
acquire an original encryption result that is used when an unknown terminal device accesses a network, wherein the original encryption result is generated by the unknown terminal device for identification information of an application on the unknown terminal device by using a key and an identity of the unknown terminal device using a preset encryption algorithm, and wherein the original encryption result is used to represent information that is required for the unknown terminal device to access the network and for identification and authentication of the unknown terminal device for network access;
generate an encryption result corresponding to each terminal device using stored security information that is of each of a plurality of terminal devices and is reported to the network device, wherein the security information comprises parameters that are required when generating encryption results, wherein each encryption result from among the encryption results corresponds to a specific terminal device;
determine that a terminal device is the unknown terminal device when an encryption result that is among the encryption results generated by the network device and is corresponding to the terminal device is the same as the original encryption result, and
wherein an encryption result is different for each application on the terminal device such that the terminal device generates a different encryption result depending on identification information of each application the terminal device uses to access the network.

10. The network device according to claim 9, wherein the security information that is of the terminal device and is reported to the network device comprises a key, an identity, a preset encryption algorithm, and identification information of at least one application on the terminal device, wherein the identity of the terminal device comprises at least one of an International Mobile Equipment Identity (IMEI) and an International Mobile Subscriber identity (IMSI) of the terminal device, and wherein the computer processor is configured to generate the encryption result corresponding to each terminal device using a key and an identity of each terminal device and identification information of at least one application on each terminal device and by means of an algorithm based on a one-way function.

11. The method for improving information security according to claim 1, wherein the encryption result is calculated by finding a Secure Hash Algorithm (SHA) value of a number associated with the application.

12. The method for improving information security according to claim 1, further comprising storing the encryption results for multiple applications of the terminal device on a network side, wherein the encryption results are different for each one of the multiple applications.

13. The method for improving information security according to claim 1, wherein the terminal device truncates the encryption result to a 45 bit binary string, stores the 45 bit binary string, converts the 45 bit binary string to a 15 place decimal number, and sends the 15 place decimal number to a network side.

14. The method for improving information security according to claim 1, wherein accessing the network comprises the terminal device accessing an online function of the application.

15. The method for improving information security according to claim 4, further comprising storing the key and the identity of the unknown terminal device to a third-party database.

16. The terminal device according to claim 6, wherein the encryption result is calculated by finding a Secure Hash Algorithm (SHA) value of a number associated with the application.

17. The terminal device according to claim 6, wherein the instructions further cause the processor to be configured to store the encryption results for multiple applications of the terminal device on a network side, and wherein the encryption results are different for each one of the multiple applications.

18. The terminal device according to claim 6, wherein the instructions further cause the processor to he configured to:
   truncate the encryption result to a 45 bit binary string;
   store the 45 bit binary string;
   convert the 45 bit binary string to a 15 place decimal number; and
   send the 15 place decimal number to a network side.

19. The terminal device according to claim 6, wherein the instructions further cause the processor to be configured to access an online function of the application.

20. The network device according to claim 9, wherein the instructions further cause the processor to store the key and the identity of the unknown terminal device to a third-party database.

* * * * *